Oct. 3, 1944.                J. T. FIESE                2,359,472
                            BRUSH DEFLECTOR
                           Filed July 5, 1943

Inventor
J. T. Fiese

Patented Oct. 3, 1944

2,359,472

UNITED STATES PATENT OFFICE 2,359,472

BRUSH DEFLECTOR

Jesse T. Fiese, Fresno, Calif., assignor to Fiese and Firstenberger, Fresno, Calif., a copartnership Application July 5, 1943, Serial No. 493,585

10 Claims. (Cl. 55—118)

This invention relates in general to an improvement in rotary shredders as used in orchards, vineyards, etc., to finely chop or shred brush pruned from the trees or vines and lying in rows therebetween; the shredded brush providing valuable ground humus.

Rotary shredders for the above use include, in a wheel supported frame, adapted to be moved along in straddling relation to a row of brush, a transversely mounted cylinder or rotor of substantial length which is disposed close to the ground and driven at relatively high speed in a direction contra to the direction of rotation of the wheels; such rotor having circumferential rows of shredding teeth which cooperate with a shredding concave disposed above but adjacent thereto. As the machine moves along and over a row of brush, the toothed rotor sweeps such brush upwardly and thence between the rotor and concave, where the brush is thoroughly macerated before falling away from the rotor onto the ground.

As the rotor turns at relatively high speed and contra to the direction of rotation of the wheels, it creates a forwardly and upwardly flowing air blast, and this air blast has a tendency to blow light brush away from the ends of the rotor and laterally of the machine. Additionally, the rotor teeth frequently strike and throw pieces of brush out of the path of the machine, especially when working in light brush. This is a particularly undesirable result as brush thus blown or thrown away from the row is missed and not shredded.

It is therefore the principal object of this invention to provide novel brush deflectors which are mounted on the machine adjacent and ahead of the end portions of the rotor; such deflectors being operative to prevent brush from being blown or thrown laterally of the machine, as previously explained.

Another object is to provide brush deflectors, as above, which comprise elongated deflector members, the lower half or bottom portion of which are semi-circular in cross section; such deflector members being mounted for vertical adjustment.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
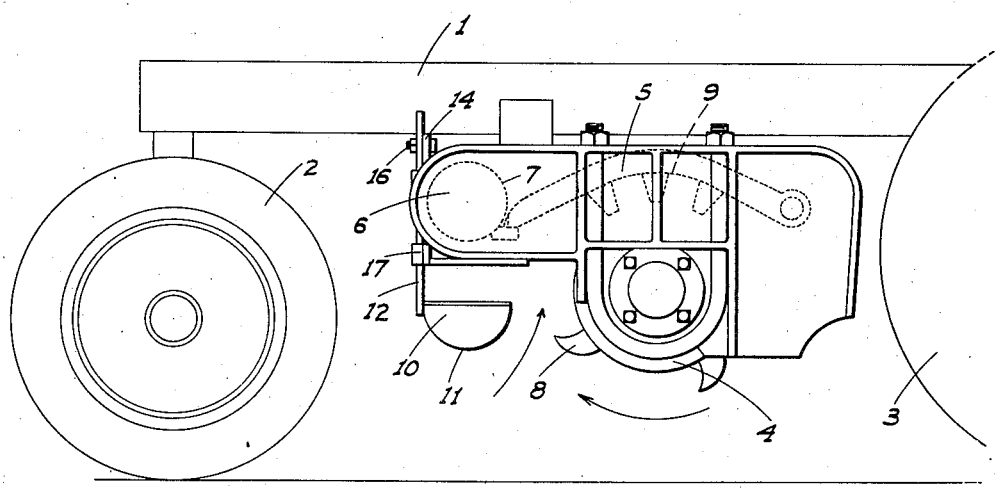
Figure 1 is a side elevation, partly diagrammatic, of a brush shredder embodying the invention.

Referring now more particularly to the characters of reference on the drawing, the brush shredding machine on which the invention is used comprises generally a frame 1 supported at its forward end by transversely spaced wheels 2 and at its rear end by transversely spaced wheels 3.

The rotor and shredding concave assembly is suspended from the frame 1 between wheels 2 and 3 and includes an elongated, transversely extending cylinder or rotor 4 disposed horizontally and adjacent the ground. This rotor is journaled at its ends in a sub-frame which includes reinforced end plates 5; such plates projecting ahead of the rotor as at 6, and such projecting portions terminating at their lower edges some distance above the horizontal plane of the rotor axis. A tubular cross member 7 connects the projecting portions 6 of the side plates at the forward end thereof.

The rotor includes a plurality of rows of outwardly projecting teeth 8 which cooperate with a shredding concave 9 mounted between end plates 5 above the rotor; the rotor being driven at relatively high speed in the direction shown by the arrow in Fig. 1. The drive mechanism is not shown. A rotor and concave of this general construction is shown in U. S. Patent No. 2,148,547.

Each of the brush deflectors which are the subject of the present invention, and which two are employed as will hereinafter appear, comprises an elongated deflector body 10 which is of semi-circular configuration in cross section with the rounded side 11 facing downward as shown. The body 10 is relatively short as compared to the length of rotor 4, and a flat, rectangular attachment tongue 12 is rigidly but adjustably secured to and upstands from the forward and upper edge of body 10.

Figure 2:
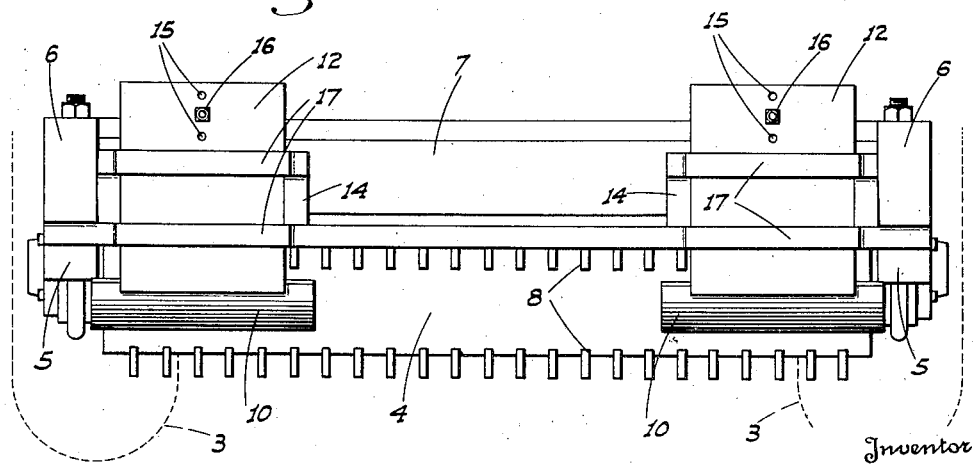
Figure 2 is a front end view of the rotor and concave assembly, including the deflector members as mounted in connection therewith.

The two deflectors are disposed horizontally and transversely in adjacent but spaced relation to and ahead of the rotor, and with the outer ends of the bodies 10 slightly outwardly of corresponding ends of the rotor, as shown in Fig. 2. The rounded lower side 11 of each deflector is disposed in a horizontal plane adjacent but slightly above the horizontal plane of the bottom of rotor 4, and the adjacent rounded side portions of each deflector and the rotor define an upwardly converging open ended throat 13.

The deflectors are adjustably supported as follows:

Vertical back plates 14 are secured on the front of cross member 7 adjacent the ends thereof, and the attachment tongues 12, each of which includes a vertical row of holes 15 for a bolt 16, are secured by the latter in face to face engagement with said back plates 14. Vertically spaced, horizontal cross straps 17 engage the face of each tongue 12 in stabilizing relation. In effect these straps, with the back plates, form guide and locating sleeve or sockets for the tongue.

In operation, the air blast from the rotor end portions is directed mainly into the throats 13, and brush which heretofore has been blown or thrown clear of the machine from adjacent the ends of the rotor, now strikes the curved under side of the bodies 10 and is thence drawn upward through throats 13 into the shredding assembly.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of an end portion of the rotor, and means mounting the same in rigid connection with the frame, and in a normally fixed position relative to the rotor.

2. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of and corresponding to an end portion of the rotor, and means mounting said deflector body in rigid connection with the frame and in a normally fixed position relative to the rotor, the under side of said body being rounded and disposed in a horizontal plane adjacent but slightly above the horizontal plane of the low point of the rotor.

3. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of and corresponding to an end portion of the rotor, and means mounting said deflector body in rigid connection with the frame and for vertical adjustment from a normally fixed position relative to the rotor.

4. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of and corresponding to each end portion of the rotor, and means mounting said deflector bodies in rigid connection with the frame and in normally fixed position relative to the rotor, the under side of said bodies being rounded and disposed in a horizontal plane adjacent but slightly above the horizontal plane of the low point of the rotor, and said deflector bodies being relatively short as compared to the length of the rotor, the outer ends of the deflector bodies extending to at least the longitudinal plane of the corresponding outer end of the rotor.

5. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of and corresponding to an end portion of the rotor, the portion of the deflector body adjacent the rotor being rounded in upwardly converging relation to said rotor forming a throat therebetween, and means mounting said body in rigid connection with the frame and in normally fixed position relative to the rotor.

6. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of and corresponding to each end portion of the rotor, the portion of the deflector bodies adjacent the rotor being rounded in upwardly converging relation to said rotor forming a throat therebetween, and means mounting said bodies in rigid but independently vertically adjustable connection with the frame, said deflector bodies normally being fixed relative to the rotor.

7. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of and corresponding to each end portion of the rotor, each body being generally semi-circular on the under side, a rigid attachment tongue upstanding from the forward portion of each deflector body, and means securing said tongue in rigid but vertically adjacent relation in connection with the frame.

8. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of and corresponding to each end portion of the rotor, each body being generally semi-circular on the under side, a rigid attachment tongue upstanding from the forward portion of each deflector body, and means securing said tongues in rigid but vertically adjacent relation in connection with the frame, said means for each tongue comprising in unitary relation a back plate and straps extending across the face of said plate in spaced relation thereto whereby to form with said back plate a socket for the tongue.

9. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a horizontal, transversely extending deflector body disposed in relatively closely spaced relation ahead of opposite end portions of the rotor, said bodies being relatively short as compared to the rotor and semi-circular in cross section with the rounded portion on the under side, the outer end of each body being substantially alined longitudinally of the machine with the corresponding end of the rotor, and means vertically adjustably mounting said deflectors in suspended relation from the frame, said deflector bodies normally being fixed relative to the rotor.

10. Brush deflecting apparatus for a brush shredding machine which includes a transverse, toothed rotor mounted horizontally adjacent the ground on a supporting frame, said rotor being adapted to be driven at relatively high speed in a direction opposite to the direction of movement of the machine; said apparatus comprising a transversely extending deflector body disposed ahead of an end portion of the rotor, and means suspending the same in rigid relation from the frame and in normally fixed position relative to the rotor, the body portion adjacent the rotor being rounded and adjacent surfaces of said body portion and rotor converging upwardly.

JESSE T. FIESE.